United States Patent

[11] 3,553,380

[72] Inventor Charles Greenwald
Livingston, N.J.
[21] Appl. No. 770,683
[22] Filed Oct. 25, 1968
[45] Patented Jan. 5, 1971
[73] Assignee International Telephone and Telegraph Corporation
Nutley, N.J.
a corporation of Delaware

[54] MULTIPLEXING SYSTEM
9 Claims, 2 Drawing Figs.

[52] U.S. Cl. .......... 179/15
[51] Int. Cl. .......... H04j 1/06
[50] Field of Search .......... 179/15SYNC, 15ASI, 15, 15D, 15SSB, 15ASYNC; 332/44; 325/138, 152

[56] References Cited
UNITED STATES PATENTS
2,206,682 7/1940 Wassell .......... 325/152
3,202,765 8/1965 Byrne .......... 179/15(sync)
3,238,472 3/1966 Crompton-Couvela .......... 332/44
3,258,694 6/1966 Sheperd .......... 325/138

*Primary Examiner*—Kathleen H. Claffy
*Assistant Examiner*—David L. Stewart
*Attorneys*—C. Cornell Remsen, Jr., Walter J. Baum, Percy P. Lantzy, Philip M. Bolton, Isidore Togut and Charles J. Johnson, Jr.

ABSTRACT: N voltage controlled oscillators produce N frequency multiplexed IF signals, each of which are frequency modulated by a different one of N intelligence signals when present. An intelligence signal-operated switch coupled to each of the oscillators prevent the IF signal of an associated oscillator from being coupled through an up converter to the transmitter power amplifier in the absence of intelligence signal at the input of the oscillator so that the given power output of the power amplifier is equally distributed between only the modulated IF signals.

Fig. 1

INVENTOR
CHARLES GREENWALD
BY Alfred C. Hill
AGENT

MULTIPLEXING SYSTEM

BACKGROUND OF THE INVENTION

This invention relates to multichannel communication systems and more particularly to multiplexing of arrangements for such systems.

It is the usual practice in prior art multichannel systems to multiplex the multichannel intelligence at baseband. This audio frequency multiplexed signal is then up converted to an IF (intermediate frequency) region and this IF multiplexed signal is then up converted to the desired RF (radio frequency) region. Due to the presence of this quantity of equipment in the previous multichannel communications systems, the probability of component failure is increased and, therefore, the communication system reliability is reduced.

In addition, in the prior art multiplexed multichannel communication systems the transmitter power, as provided by the power amplifier, is allocated or distributed between all of the channels of the multiplexed signal whether these channels are all active or not, that is, whether channels contain modulation or not.

SUMMARY OF THE INVENTION

An object of the present invention is to provide a multiplexing system that provides greater inherent reliability for the communication system than obtainable with the above-mentioned prior art multiplexing signal.

Another object of the present invention is to provide automatic allocation of available power amplifier output to only the active (modulated) channels of the multiplex signal resulting in increased performance for the communication system.

Still another object of the present invention is to provide a radio frequency multiplex system wherein the multiplexing is accomplished in the IF region and enables space or frequency diversity transmission of these multiplexed signals.

A further object of this invention is to provide an IF multiplexing system wherein there is automatic allocation of available transmitted power to only the active channels resulting in increased performance for the communication system, such as greater effective radiated power per channel under a multichannel operating conditions.

A feature of this invention is the provision of a multichannel multiplexing signal comprising N intelligence signal sources, where N is an integer greater than 1; first means coupled to the sources to produce N frequency multiplexed intermediate frequency signals each being associated with a different one of the sources for modulation thereof by an intelligence signal when present at the output of the associated source; second means to provide a given power output for transmission; and third means coupled to each of the sources, the first means and the second means responsive to the absence of intelligence signal from its associated source to prevent its associated intermediate signal from being coupled to the second means to enable equal distribution of the given power output between the modulated intermediate frequency signals coupled to the second means.

Another feature of this invention is a multichannel multiplexing system including the above-mentioned components and further including a fourth means coupled to the second means to provide diversity transmission of the modulated intermediate frequency signals.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figures 1, 2:
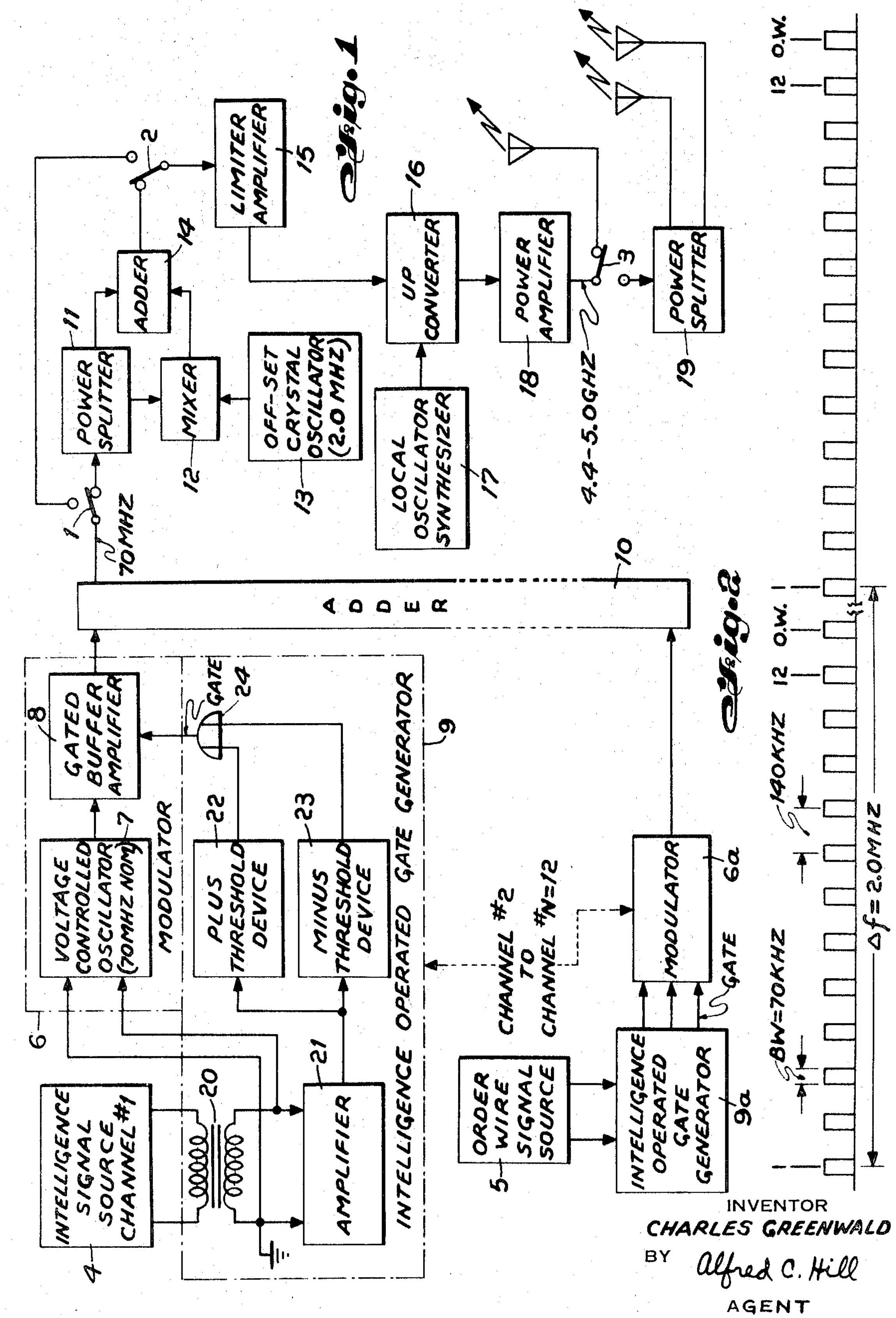
FIG. 1 is a block diagram illustrating the multiplexing system in accordance with the principles of this invention.
FIG. 2 is an illustration of the multiplexed channel signal that may be employed for space or frequency diversity transmission from the transmitter illustrated in FIG. 1.

In the drawing and in the description that will follow there are certain specific frequencies illustrated and mentioned and certain power quantity mentioned. These values are for the purposes of illustration only and, of course, it will be recognized that these values may be varied to meet specifications of other applications and systems employing the multiplexing system of this invention without variation from the inventive concept disclosed herein.

Referring to FIG. 1, the multiplexing system will first be described with reference to a frequency diversity communication transmitter. This can be provided by positioning switches 1, 2 and 3 in the positions illustrated. For purposes of explanation, there are individual voice or other intelligence channel sources for channel 01 to channel 0N, where N is illustrated as being equal to 12, and an order wire channel. Intelligence signal source 4 provides the intelligence signal for channel 01 and similar sources will provide intelligence signal for channels 02—012. The order wire signal is provided by source 5. Each of the channels have coupled to the associated channel source modulator 6, which includes voltage controlled oscillator 7 to enable frequency modulation of the center frequency of the oscillator by the intelligence signal. Oscillator 7 of each modulator 6 is arranged to be separated by 140 kHz. clustered around 70 mHz. as illustrated in FIG. 2, thereby providing a frequency multiplexed signal in the IF frequency range. The output of each oscillator 7 is coupled to gated buffer amplifier 8 which is controlled by a gate signal from the output of the intelligence operated gate generator 9. Generators 9 are coupled to associated ones of the sources 4 and source 5 to detect whether the intelligence signal is greater than a given threshold which, in the case of voice intelligence, would indicate whether this voice intelligence was greater than a positive threshold or less than a negative threshold. Under these conditions, generators 9 would produce a gate for coupling to amplifier 8 to permit the modulated IF signal to be coupled to adder 10. On the other hand, if the intelligence signal is between the two threshold levels, there will be no gate applied to amplifier 8 and, thus, the unmodulated or inactive IF signal from oscillator 7 would be blocked from reaching adder 10.

The sum of the frequency modulated signals clustered around 70 mHz. is coupled from adder 10 to power splitter 11 which provides two outputs, one of which is offset in frequency by approximately 2 mHz. as illustrated in FIG. 2 by means of mixer 12 and oscillator 13 for full frequency diversity operation. The output of splitter 11 and the output from mixer 12 (the offset frequency output) are added together in adder 14 to provide the channel arrangement as illustrated in FIG. 2 for coupling to limiter amplifier 15. Thus, the two groups of 13 frequency modulated channels, each separated by the offset frequency, are combined and fed into wideband limiter 15 which serves two functions. The first function provides essentially constant peak amplitude signals which are then up converted to the final transmitter frequency by up converter 16 and local oscillator synthesizer 17. This permits normal high efficiency operation in a klystron amplifier. The second function of limiter 15 provides constant output independent of the number of voice channels that are being used or modulated.

The output from up converter 16 is coupled to power amplifier 18 which provides a power output including power at two groups of 13 individual frequencies plus intermodulation products. The total signal power is equal to the single signal power minus 1 db. Thus, for a 1 kilowatt power amplifier, the total signal power is 800 watts. The remaining 200 watts are intermodulation products. For the illustrated 12 channels plus order wire system, the power output per channel, when all channels are on or active equal 800 watts divided by $(2 \times 13)$ or 30.8 watts per channel. With the large number of signals here, the intermodulation products are distributed uniformly throughout the band and may be treated as noise. In the system illustrated, with the parameters disclosed and multiple signal considerations, a receiver channel bandwidth of 70 kHz. with 140 Hz. spacing, the resultant carrier-to-intermodulation noise ratio equals 11.5 db. For the all channel used condition, the available power of 30.8 watts per channel is more than 1 db. greater than necessary to permit intelligible transmission of information 99.98 percent of the time, in other words, the power per channel is sufficient to make the channel available 99.98 percent of the time for intelligible transmission of information, where the percentage stated is a system target specification referenced to 100 percent as well as a channel signal-to-noise ratio of at least 42.5 db. for more than 99.98 percent of the time. Since the available total signal power divides equally among the various frequency channels, as the number of frequency channels increases or decreases, the power per frequency channels will correspondingly change. With only one channel on, the entire 1 kilowatt power automatically appears on that single channel. The advantages of this mode of operation become apparent since with channel activity of 25 percent, the power per channel at any instant is automatically increased by 2.6 db. which can provide an additional fade margin or permit a reduction in power output or antenna gain.

Loading requirements in multichannel systems may vary widely depending on the system used, the information employed (voice, data, or the like), the anticipated activity, and the details of the specific statistical characteristics of the information. Regardless of the method of modulation and multiplexing, advantage may be taken of the activity factor to improve the power per channel when less than 100 percent activity is contemplated. When a single channel at a given time is not being used, it contributes nothing to the multichannel load.

In the system of this invention, separate frequency modulated signals are combined, hard limited, and then amplified and transmitted. This sequence of operations would preclude taking advantage of varying or adjusting any of the known multichannel load requirements such as described in the preceding paragraph and which can be calculated for this system. However, the idea of switching each channel "on" or "off" prior to combining is being used to gain an overall system improvement. Since the system limits, no advantages may be taken of the voice amplitude statistics. There will be some improvement because the output power per channel increases as separate channels are removed from the limiter input. This should reflect an increase in the output detected signal-to-noise ratio of each channel. It can be argued that since the system is to be operating near threshold a large part of the time, that it must be above threshold while signal energy from all active channels are present. In this case, it is possible to only take advantage of the load variation that results from the activity anticipated.

In addition, where increased power per channel is required because of marginal operational conditions, additional power is available by limiting the number of channels. This has further advantage when reliable circuits are needed for high priority communication. In addition, during the system acquisition, operating with only one channel increases the power output on that channel from 30.8 watts to 1 kilowatt, which is equal to a 12 db. increase in sensitivity.

This completes the description and advantages of a frequency diversity system employing the principles of this invention. Now if switches 1, 2 and 3 are moved to their other positions, there is obtained a space diversity system employing the techniques of this invention. By so positioning these switches, the 2 mHz. offset circuitry is eliminated and power splitter 19 is inserted at power amplifier 18 output to feed two-spaced antenna sections for space diversity transmission.

Therefore, the multiplexing system of this invention and the automatic allocation of available transmitted power to only the active channels in accordance with the principles of this invention can be used for both frequency and space diversity transmission.

The special features and advantages of this invention are obtained by oscillator 7 in the form of crystal controlled oscillators having a 70 mHz. nominal frequency voltage controlled for modulation on frequencies separated by 140 kHz. This eliminates the conventional baseband multiplexing arrangement. The intelligence operated gate generator 9 and gated buffer amplifier 8 control the output of the frequency modulated oscillators 7 to divert maximum available carrier power to channels in use. This includes limiting in limiter 15 prior to high level mixing in up converter 16 to ensure 1 kilowatt output power regardless of the number of voice channels in use.

In the multiplexing system of this invention, it is required that each voltage controlled oscillator 7 of modulator 6 carry a single voice channel with a maximum deviation of 35 kHz. and a center frequency stability of ±0.01 percent. In addition, means are provided to switch the modulator output "on" and "off" as the intelligence signal drops below a predetermined threshold level for each channel. Pullable, crystal controlled oscillators can be used rather than free running voltage controlled oscillator which would require an automatic frequency control to meet long term stability. This approach offers a reduction in complexity and size of the unit as well as an increase in its reliability. In the design of pullable, crystal oscillators, a voltage sensitive reactance is placed in series with the crystal which varies its series resonance point, thereby causing the frequency to change. The amount that a crystal oscillator can be pulled usually involves a compromise between stability and frequency deviation which can be achieved by a judicious choice of the amount of feedback. The modulating element that is normally employed is a voltage sensitive capacitance, or vari-cap (capacitance controlled diode). In accordance with the system disclosed, a crystal controlled oscillator centered around 70 mHz frequency modulated through a vari-cap is followed by buffer amplifier 8, which can be switched "on" and "off" by a gate pulse. The crystal oscillator frequency deviation of ± 35 kHz. out of 70 mHz. represents a ± 0.043 percent change in frequency and a ± 2.06 percent change in capacitance which can be obtained using standard high Q vari-caps. To obtain a linearity of better than 1 percent, a vari-cap with the necessary square law characteristic in the back biased region is employed.

Intelligence operated gate generator 9 produces the gate which controls amplifier 8 to switch the output of frequency modulated oscillator 7 "on" or "off," depending upon the presence or absence of intelligence from source 4. Generator 9 will turn "off" the IF output of oscillator 7 whenever its respective intelligence signal input is close to zero. The system will operate at syllabic rate or faster. The intelligence output of source 4 (a voice signal) feeds transformer 20 which provides a match between the balanced voice frequency input and the unbalanced input of modulator 6 and amplifier 21. Amplifier 21 provides a necessary signal gain for stable switching just above and below zero axis crossings. The amplifier output is sensed by two threshold devices 22 and 23. Positive threshold device 22 provides an output when the voice frequency signal is equal to or above a positive threshold level. Similarly, negative threshold device 23 provides an output when the voice frequency signal is equal to or below a negative threshold level. The OR gate 24 combines the two outputs from devices 22 and 23 to provide the gate control for amplifier 8. Thus, in the presence of any measurable voice input to any one of the modulators, the modulator produces its full 150 miliwatt output, frequency modulated, while channels without voice inputs do not contribute to the total modulator output power.

While I have described above the principles of my invention in connection with specific apparatus, it is to be clearly understood that this description is made only by way of example and not as a limitation to the scope of my invention as set forth in the objects thereof and in the accompanying claims.

I claim:

1. A multichannel multiplexing system comprising: N intelligence signal sources, where N is an integer greater than one;

first means coupled to said sources to produce N frequency multiplexed intermediate frequency signals each being associated with a different one of said sources for frequency modulation thereof by an intelligence signal when present at the output of said associated source;

second means to provide a given power output for transmission; and third means coupled to each of said sources, said first means and said second means responsive to the absence of intelligence signal from its associated source to prevent its associated intermediate frequency signal from being coupled to said second means, said given power of said second means thereby being equally distributed between said modulated intermediate frequency signals coupled to said second means.

2. A system according to claim 1, further including fourth means coupled between the output of said third means and the input of said second means to provide frequency diversity transmission of said modulated intermediate frequency signals.

3. A system according to claim 1, further including fourth means coupled to the output of said second means to provide space diversity transmission of said modulated intermediate frequency signals.

4. A system according to claim 1, wherein said first means includes N voltage controlled oscillators, each being coupled to a different one of said sources.

5. A system according to claim 1, wherein said second means includes:

limiter means coupled to said third means; and a power amplifier coupled to said limiter means, said power amplifier providing said given power.

6. A system according to claim 1, wherein said third means includes:

N intelligence signal operated gate pulse generators each coupled to a different one of said sources; and N gated means coupled to said first means and a different one of said gate pulse generators, each of said gated means being associated with a different one of said intermediate frequency signals.

7. A system according to claim 6, wherein each of said gate pulse generators include:

a positive threshold means coupled to one of said sources;

a negative threshold means coupled to said one of said sources; and an OR gate coupled to said positive threshold means, said negative threshold means and said gated means.

8. A system according to claim 6, wherein said third means further includes a signal combining means coupled to the output of each of said gated means.

9. A system according to claim 1, wherein:

said first means includes:

N voltage controlled oscillators each being coupled to a different one of said sources;

said third means include:

N intelligence signal gate pulse generators each coupled to a different one of said sources;

N gates means each being coupled to a different one of said gate pulse generators and a different one of said oscillators, said one of said oscillators being coupled to said one of said sources coupled to the associated one of said gate pulse generators; and a signal combining means coupled to the output of each of said gated means; and said second means includes;

limiter means coupled to said combining means; and a power amplifier coupled to said limiter means, said power amplifier providing said given power.